Patented Mar. 25, 1924.

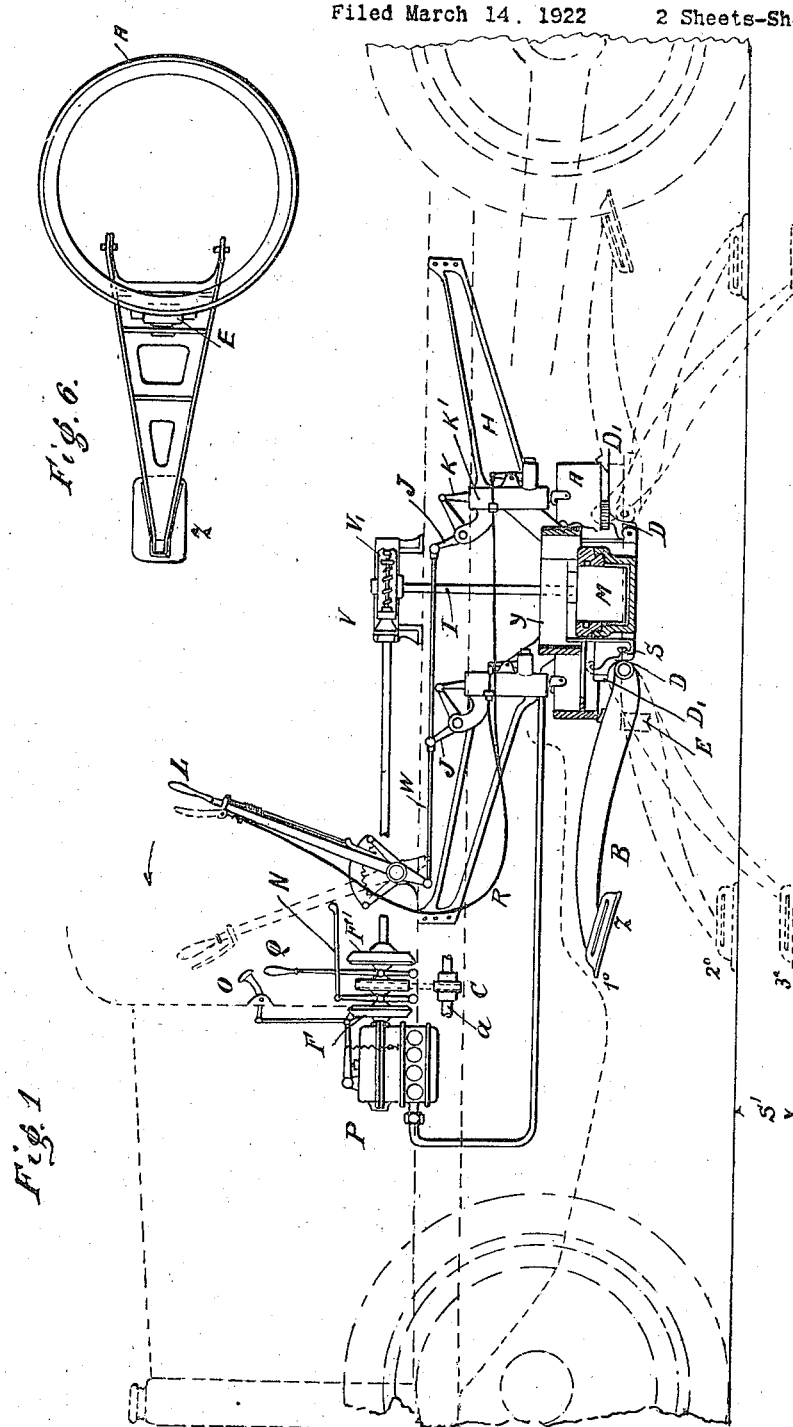

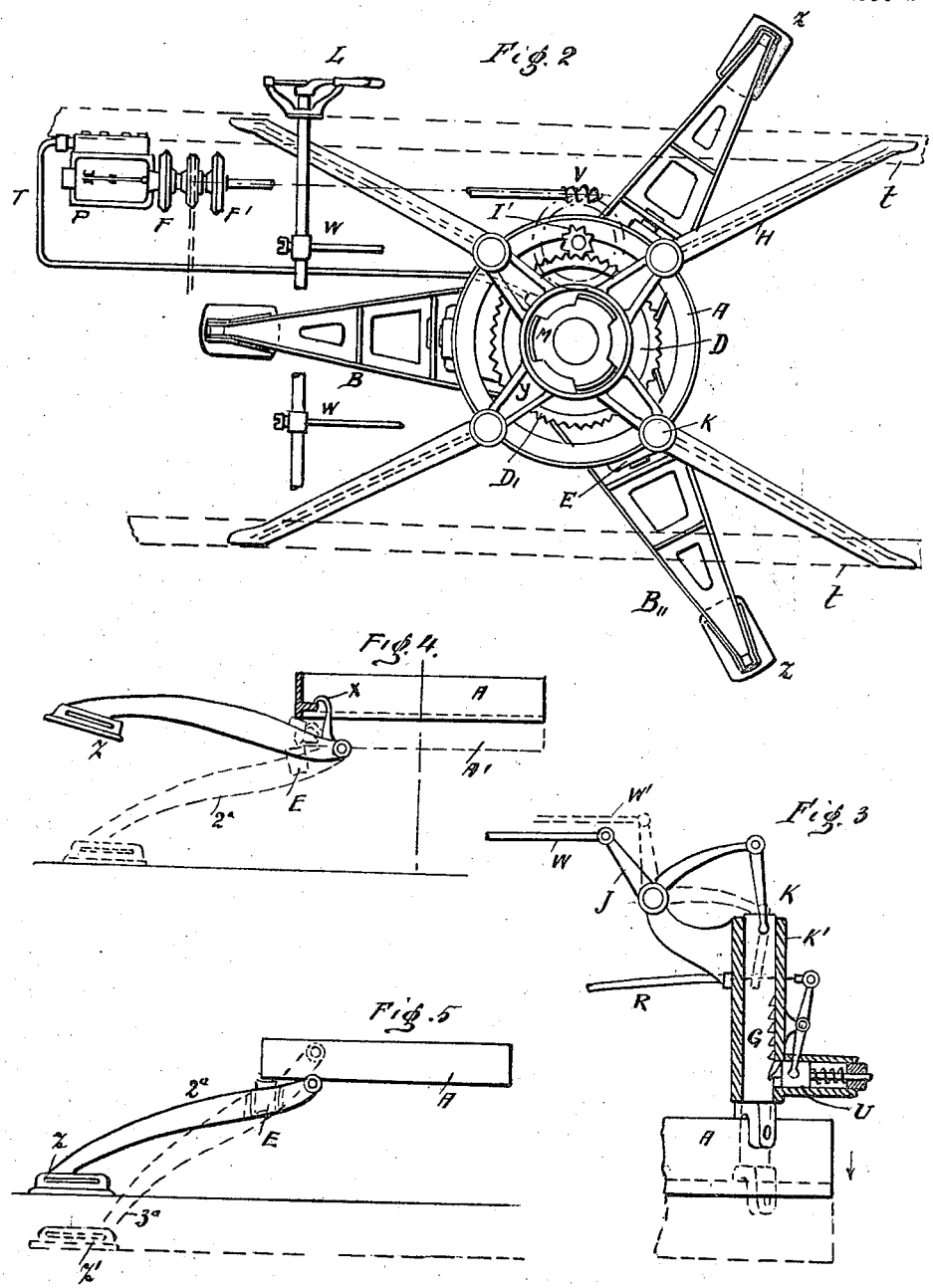

1,488,038

UNITED STATES PATENT OFFICE.

ALDO FIORENTINO, OF MILAN, ITALY.

APPARATUS FOR LIFTING AND TURNING MOTOR VEHICLES.

Application filed March 14, 1922. Serial No. 543,756.

*To all whom it may concern:*

Be it known that I, ALDO FIORENTINO, subject of the King of Italy, residing at 6 Via Gesu, Milan, in the Kingdom of Italy, have invented a new and useful Apparatus for Lifting and Turning Motor Vehicles, of which the following is a specification.

The apparatus, or better the aggregate of mechanical devices, forming the subject matter of the present invention is intended for permanent application to motor cars in particular and to other kinds of self-propelled vehicles in general.

The object of this apparatus consists in the capability to at any time turn the vehicle through full 180° on narrow roads and to in consequence avoid the troublesome and primitive manoeuver of driving forwardly and rearwardly and the time loss involved.

Furthermore, in the special case of motor cars, the apparatus effects several other important results, namely:

1. Quick and practical raising clear of the ground of all the four road wheels for tire replacing, repairing purposes and the like.

2. Possibility, when the car is out of commission, to hold it with the wheels raised clear of the ground, thus avoiding the harmful continuous load on tires and air chambers.

3. Convenience in handling when washing or repairing the motor car and especially when dealing with it in the garage.

The apparatus along with its various devices is diagrammatically shown in the annexed drawing, in which:

Fig. 1 is a longitudinal section;
Fig. 2 is a plan;
Fig. 3 shows the controlling gear in section;
Figs. 4 and 5 show one of the car lifting legs in two different positions.
Fig. 6 shows the said leg in plan.

A small pump P with four or more pistons is intended to furnish a pressure liquid at 80–100 kilos per square centimetre (1143–1430 lbs. per sq. inch). This pump is driven by the main shaft $a$ through a chain and sprocket wheel which usually run idle. The piston and valves are preferably submerged in oil, this oil serving, not only as a lubricant but also as a pressure liquid.

At the centre portion of the frame $t$ of the machine is fitted a supporting cross composed of four arms H which carry the car lifting device proper comprising:

A substantial ring A supported on four plungers K adapted to vertically slide in sleeves K' secured to the frame $t$. The plungers K are operated by small bell-crank levers J and links W connected to the control lever L. When the lever L is moved in the direction of the arrow (Fig. 1) the links W take up the position W' and lower the ring A into the position A' in the manner shown in Figs. 3 and 4.

The plungers K are fitted with notches G which, by means of cables running in the pipes R and actuating a spring loaded pawl U, permit of locking the plunger K in raised position at any desired height (Fig. 3).

In the center of the ring A a lifting jack M is arranged, consisting in a small hydraulic press comprising a cylinder Y and a large piston actuated by the pressure furnished by the pump P.

On the head of said piston is mounted a rim D revolving on a ball bearing path, the rim being fitted with teeth D' and having firmly hinged to it the three legs B, B', B''. The rim D with its teeth D' forms a crown gear or turning rack. The said legs may be suspended to the ring A by a hook X (Fig. 4), so that when the ring A is in raised position, the three legs are also raised and remain concealed under the vehicle.

When by operating the control lever L the ring A is lowered, the legs B swing out and assume the position $2^a$ and the shoes Z thereof rest on the ground as shown in Figs. 1 and 4.

This first phase of the operation being completed, the lever L on reaching the end of its stroke abuts against a link N which throws the friction sleeve F into engaged position thereby effecting operation of the pressure pump.

The pump pressure now actuates the jack which, being capable of exerting a considerable lifting power, raises the crown gear or turning rack to which the legs B, B', B'' are hinged. The whole vehicle is now lifted, because the leg suspension points, passing from the position $1^a$ to the position $2^a$ (Fig. 1) cause the legs to exert an upward pressure on the edge of the ring A by means of a roller E acting as fulcrum and as a result the legs pass from position $2^a$ to the position $3^a$ (Figs. 1 and 5).

The lower ends of the legs are fitted with shoes Z and are adapted to slide on the shoes through the instrumentality of small rollers Z'; the object of the shoes is to afford a sufficiently large bearing surface in the case of soft, inconsistent ground and to facilitate the legs sliding in towards the center when the car is being lifted.

In order to turn the car through the desired angle as soon as the car has been hoisted clear from the ground, the lever Q controlling the friction clutch F' is operated. By means of worm V, worm-wheel V', spindle I fitted with pinion I', the pinion I' is made to roll over the crown gear or turning rack D thus causing the whole frame structure, with which the pinion is fast, to revolve about the rack D; the car continues to revolve as long as the lever Q is depressed.

In order to return all of the parts into an inactive position it suffices to depress the button O which raises the valve of the pressure pump P, thus permitting the liquid to rush back into the pump reservoir owing to the load of the whole vehicle weighing upon the liquid. After the whole liquid has thus been discharged from the lifting jack, it is only necessary to throw the control lever L back into its former position, whereby the ring A is raised again and the three legs B are returned to the position 1ª, that is to say sufficiently clear of the road surface.

The handle of the control lever L pulls the flexible ropes R, which disengage the notches G of the plungers (Fig. 3) and thus permit the ring A to be raised or lowered.

Having now particularly described and ascertained the nature of my said invention and in what manner the same is to be performed, I declare that what I claim is:—

1. A lifting and turning apparatus for motor vehicles comprising in combination a support connected to the frame of the vehicle and including a rack with respect to which the support is turnable, legs pivoted to the rack, ground engaging feet slidably connected to the legs, means for lowering the legs, means for raising the rack to effect a raising of the connecting points of the legs and an inward sliding of the outer ends of the legs to consequently lift the vehicle and means on the vehicle frame and associated with the rack for effecting a turning of the vehicle when raised.

2. An apparatus as claimed in claim 1 wherein means for receiving the legs includes sleeves formed with the support, a ring, notched plungers connected to the ring and slidable vertically in the sleeves, a manually operable lever arrangement for raising and lowering the plungers and consequently the ring, means for releasably latching the plungers, and manually operable means actuatable with the lever arrangement for simultaneously releasing the latching means.

3. An apparatus as claimed in claim 1 wherein the means for raising the rack includes a hydraulic jack composed of a cylinder connected rigidly with the support, a piston in the cylinder for supporting the rack and fluid pressure means on the frame of the vehicle for operating the jack and designed to be operated upon the actuation of the means for lowering the legs.

4. An apparatus as claimed in claim 1 wherein the means for turning the rack includes a shaft on the vehicle frame, manually controlled clutch means between the shaft and the motor shaft of the vehicle, a worm on the opposite end of the shaft, another shaft, a worm wheel on the second mentioned shaft and a pinion on the second mentioned shaft and engaging the rack for working about the rack upon the engagement of the clutch with the motor shaft to effect turning of the vehicle frame, substantially as and for the purposes set forth.

5. The combination with a motor vehicle of a lifting and turning apparatus carried beneath the frame of the vehicle and including a secondary supporting frame, a vertically adjustable ring on the secondary frame, a jack including a cylinder carried by the secondary supporting frame, a vertically movable piston in the cylinder, a crown rack carried by the piston, legs pivoted to the rack, ground engaging feet slidably connected to the outer ends of the legs, means for lowering the ring to effect depressing of the legs, fluid pressure operating means on the vehicle frame for raising the piston to effect inward sliding of the legs relative to the feet and a consequent raising of the vehicle, and manually controlled operating mechanism mounted on the frame of the vehicle and associated with the rack for effecting turning of the vehicle about the rack.

6. An apparatus as claimed in claim 5 wherein rollers are mounted on the legs to facilitate rotation of the ring thereover during the turning of the vehicle frame.

Signed at Milan, Italy, this 14th day of February, 1922.

ALDO FIORENTINO.